(12) United States Patent
Collins

(10) Patent No.: US 6,710,968 B1
(45) Date of Patent: Mar. 23, 2004

(54) GUIDELESS TAPE TRANSPORT

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/453,244

(22) Filed: Dec. 2, 1999

(51) Int. Cl.[7] .............................................. G11B 5/008
(52) U.S. Cl. ...................................................... 360/83
(58) Field of Search ............................. 360/90, 83, 84, 360/85, 93, 96.3, 75, 7, 130.31; 242/355.1, 331.1, 352.5

(56) References Cited

U.S. PATENT DOCUMENTS

| 2,558,432 | A | * | 6/1951 | Haloski ........................ 360/90 |
| 2,563,445 | A | * | 8/1951 | Zenner ......................... 360/90 |
| 2,603,721 | A | * | 7/1952 | Camras .................... 360/130.31 |
| 2,702,833 | A | * | 2/1955 | Camras ......................... 360/90 |
| 2,901,548 | A | * | 8/1959 | Sager ............................ 360/7 |
| 3,133,710 | A | * | 5/1964 | Herterich ................... 242/355.1 |
| 3,207,517 | A | | 9/1965 | Tanigawa et al. |
| 3,332,635 | A | * | 7/1967 | Etal ........................ 242/352.5 |
| 3,779,482 | A | | 12/1973 | Chimura |
| 3,862,729 | A | | 1/1975 | Staar |
| 3,892,007 | A | * | 7/1975 | Pembroke ................... 15/309.1 |
| 3,930,268 | A | | 12/1975 | Uemura |
| 4,263,628 | A | * | 4/1981 | Timm ....................... 242/355.1 |
| 4,309,728 | A | | 1/1982 | Takizawa et al. |
| 4,330,802 | A | | 5/1982 | Kato et al. |
| 4,337,909 | A | | 7/1982 | Harja |
| 4,599,661 | A | | 7/1986 | Muramatsu |
| 4,809,100 | A | * | 2/1989 | Tanaka et al. .............. 360/96.1 |
| 4,943,878 | A | | 7/1990 | Lin |
| 5,173,820 | A | | 12/1992 | Yoneda |
| 5,239,432 | A | | 8/1993 | Kuroda |
| 6,005,737 | A | * | 12/1999 | Connolly et al. ............... 360/75 |

* cited by examiner

Primary Examiner—Tianjie Chen
(74) Attorney, Agent, or Firm—Brooks Kushman P.C.

(57) ABSTRACT

A tape transport system includes two reels. Each reel has a pair of parallel flanges between which the tape is held. A tape head with a tape contact surface over read elements and write elements is positioned between the reels such that tape extends from one reel, over the contact surface, and to the other reel. The contact surface is curved so that tape is in contact with different regions of the contact surface based on the amount of tape on each reel.

7 Claims, 2 Drawing Sheets

GUIDELESS TAPE TRANSPORT

TECHNICAL FIELD

The present invention relates to guiding magnetic tape from tape reels across a tape access head.

BACKGROUND ART

Magnetic tape is commonly used to store voice and data information due to its reliability, cost efficiency, and ease of use. Magnetic tape may be made more useful and cost effective by increasing the density of information stored on the magnetic tape. One method of increasing information density is to decrease the thickness of the tape thereby permitting more tape to be stored in a given volume.

Decreasing the thickness of magnetic tape creates difficulties in a tape transport system. Thinner tape more easily stretches, increasing the possibility of read and write errors. Thin tape is also susceptible to folding, kinking, creasing, curling and other mechanical damage. Thin tape is more easily skewed relative to the tape head. These difficulties are exacerbated by complex tape transport systems requiring rollers, guides, pins, and the like to drive the tape and position the tape relative to the tape head.

What is needed is an effective tape transport system for thin tape. The tape transport system must be able to guide the magnetic tape past the tape head without causing mechanical damage. The tape transport system should further be simple, inexpensive, and easy to maintain.

DISCLOSURE OF INVENTION

It is an object of the present invention to guide thin magnetic tape past a tape head.

It is another object of the present invention to increase the volume density of information stored on magnetic tape.

It is still another object of the present invention to position magnetic tape relative to the tape head.

It is yet another object of the present invention to protect magnetic tape from mechanical damage along the tape path.

It is a further object of the present invention to reduce the complexity of the tape path.

In carrying out the above objects and other objects and features of the present invention, a tape transport system is provided. Tape extends between two reels. Each reel has a pair of parallel flanges between which the tape is held. Each flange has a radius greater than a radial distance covered when the reel is full of tape. The flange pairs are parallelly aligned. A tape head with a tape contact surface over read elements and write elements is positioned between the reels such that tape extends from one reel, over the contact surface, and to the other reel. The contact surface is curved so that tape is in contact with different regions of the contact surface based on the amount of tape on each reel.

In an embodiment of the present invention, the tape head moves in a direction normal to the direction of tape travel over the contact surface. This permits tape to be loaded and unloaded without contacting the tape head.

In another embodiment of the present invention, the flange pairs on each tape reel guide the magnetic tape over the tape head.

A method of guiding magnetic tape past the tape head is also provided. The magnetic tape is contacted with the tape head. The tape is driven in a tape direction from a tape pack formed in the first reel to a curved contact surface on the tape head. The tape extends in a straight path tangentially leaving the first reel tape pack and tangentially contacting the tape head contact surface. The tape is driven in the tape direction around a contacted portion of the contact surface. The contacted portion of the tape head is based on the amount of magnetic tape formed on each tape pack. The tape is driven in the tape direction from the contact surface to a tape pack formed in the second reel. The magnetic tape extends in a straight path tangentially leaving the contact surface and tangentially contacting the second reel tape pack.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
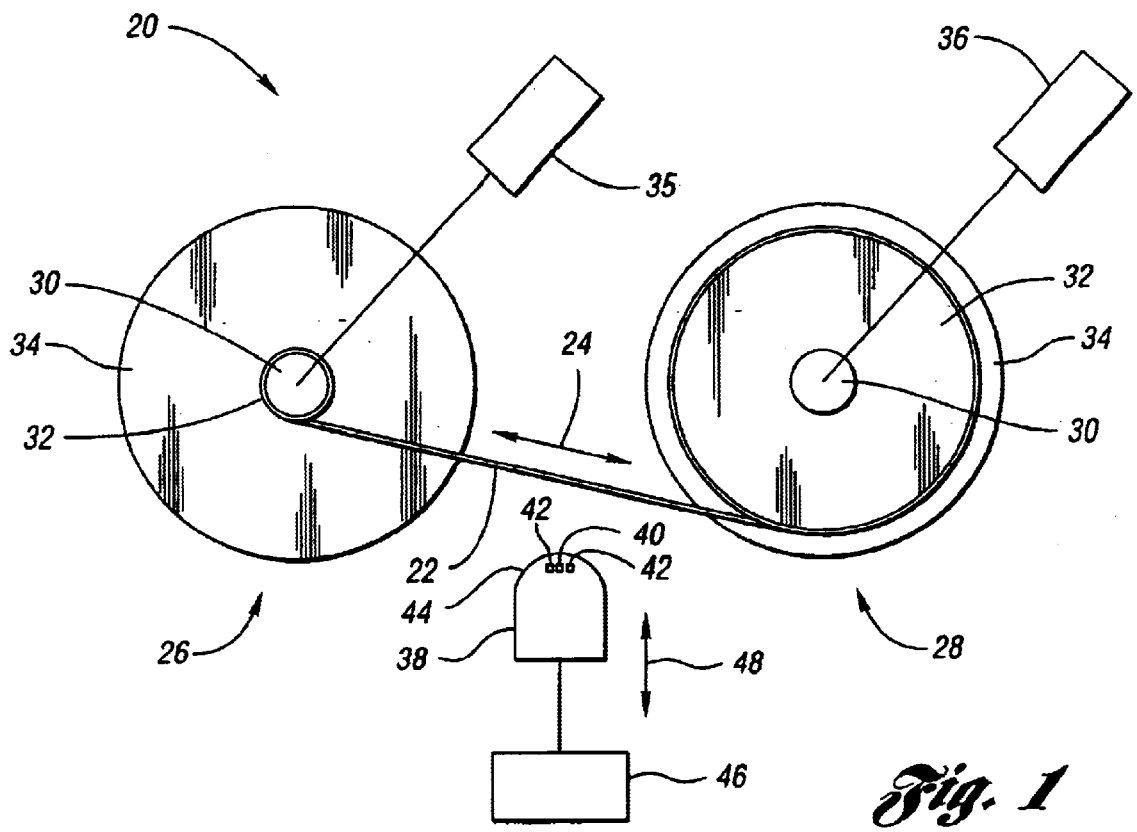
FIG. 1 is a schematic drawing of a tape transport system with a tape head withdrawn from between two tape reels according to an embodiment of the present invention.

Referring to FIG. 1, a schematic drawing of a tape transport system with a tape head withdrawn from between two tape reels according to an embodiment of the present invention is shown. A tape transport system, shown generally by 20, moves magnetic tape 22 in tape direction 24. Tape 22 travels between two reels, shown generally by 26 and 28. Reels 26, 28 may be contained within a tape cassette. Alternatively, one or both of reels 26, 28 may be held within a tape cartridge. As will be recognized by one of ordinary skill in the art, the present invention will operate with a variety of means for holding tape 22. Each reel 26, 28 includes a hub 30 about which tape 22 is wound to form tape pack 32. Each reel 26, 28 also includes a pair of flanges 34 on either side of tape pack 32 between which tape 22 is held. Typically, tape 22 is driven by tension from receiving hub 26. Receiving hub 26 may be driven by tape drive 35, such as an electric motor. For rewind or tape access in the opposite tape direction 24, hub 28 is driven by tape drive 36. Tape drives 35, 36 may operate from the same or different drive forces. Also, tape drives 35, 36 may operate concurrently to reduce the tension on tape 22. Various mechanisms that may be used for tape drives 35, 36 are well known in the art of tape transport systems.

Typically, the path of tape 22 between reels 26, 28 is altered by various rollers, guides, pins, and the like to bring tape 22 into contact with tape head 38. Tape head 38 typically includes a plurality of write elements 40 for writing data onto tape 22 and read elements 42 for reading data from tape 22. Elements 40, 42 access tape 22 as tape 22 travels over contact surface 44 on tape head 38. Tape transport system 20 eliminates the need for a complex tape path including rollers, guides, pins, and the like, which may stretch or otherwise damage tape 22, by moving tape head 38 onto tape 22. Head drive 46 extends and retracts tape head 38 in head direction 48. Head drive 46 may be implemented using a variety of means. Head drive 46 may include, for example, an electric motor driving a lead screw. A threaded nut attached to tape head 38 converts lead screw rotation into translation in head direction 48. Alternatively, a stepper or servo motor may be connected through a gear train to a linear rack attached to tape head 38. Head drive 46 may also be implemented using an electric, pneumatic, or hydraulic linear motor.

Figure 2:
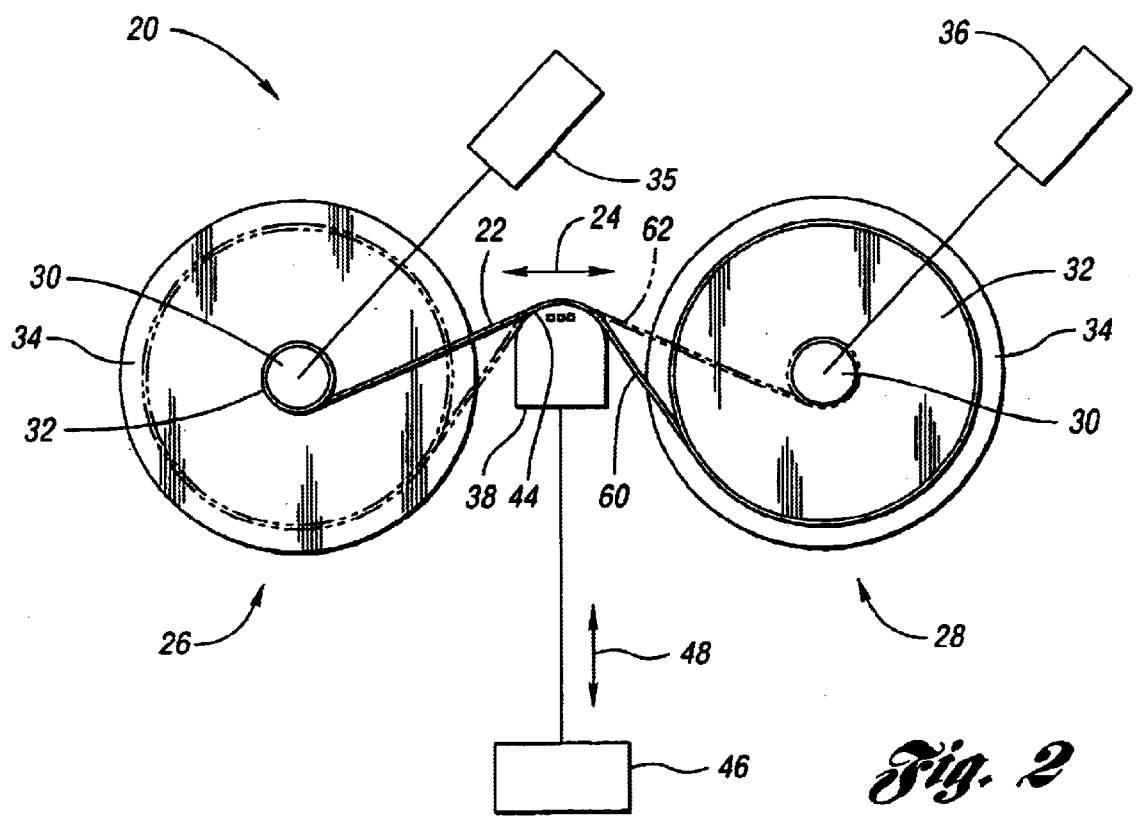
FIG. 2 is a schematic drawing of a tape transport system with a tape head inserted between two tape reels according to an embodiment of the present invention.

Referring now to FIG. 2, a schematic drawing of a tape transport system with a tape head inserted between two tape reels according to an embodiment of the present invention is shown. Tape head 38 is extended by head drive 46 to a position between reels 26, 28. In one tape direction 24, tape 22 leaves tape pack 32 on reel 28 and contacts contact surface 44 on tape head 38. Tape 22 in this portion of the tape path extends in a straight line tangentially between tape pack 32 on reel 28 to contact surface 44. Tape 22 wraps around a portion of contact surface 44. Tape 22 then leaves contact surface 44 and joins tape pack 32 on reel 26. Tape 22 in this portion of the tape path extends in a straight line tangentially between contact surface 44 and tape pack 32 on reel 26.

FIG. 2 indicates two of the many different tape paths based on the amount of tape wound on reels 26, 28. First tape path 60, shown in solid line, results from tape substantially fully wound on reel 28 and fully unwound on reel 26. Second tape path 62, shown in dashed line, results from tape substantially fully wound on reel 26 and fully unwound on reel 28. The portion of contact surface 44 covered by tape 22 depends on the size of each tape pack 32, the shape of contact surface 44, the separation of reels 26, 28, and the distance tape head 38 is extended between reels 26, 28. The design of these variables is adjusted so that tape 22 covers a sufficient portion of contact surface 44 to permit write elements 40 and read elements 42 appropriate access to tape 22.

Figure 3:
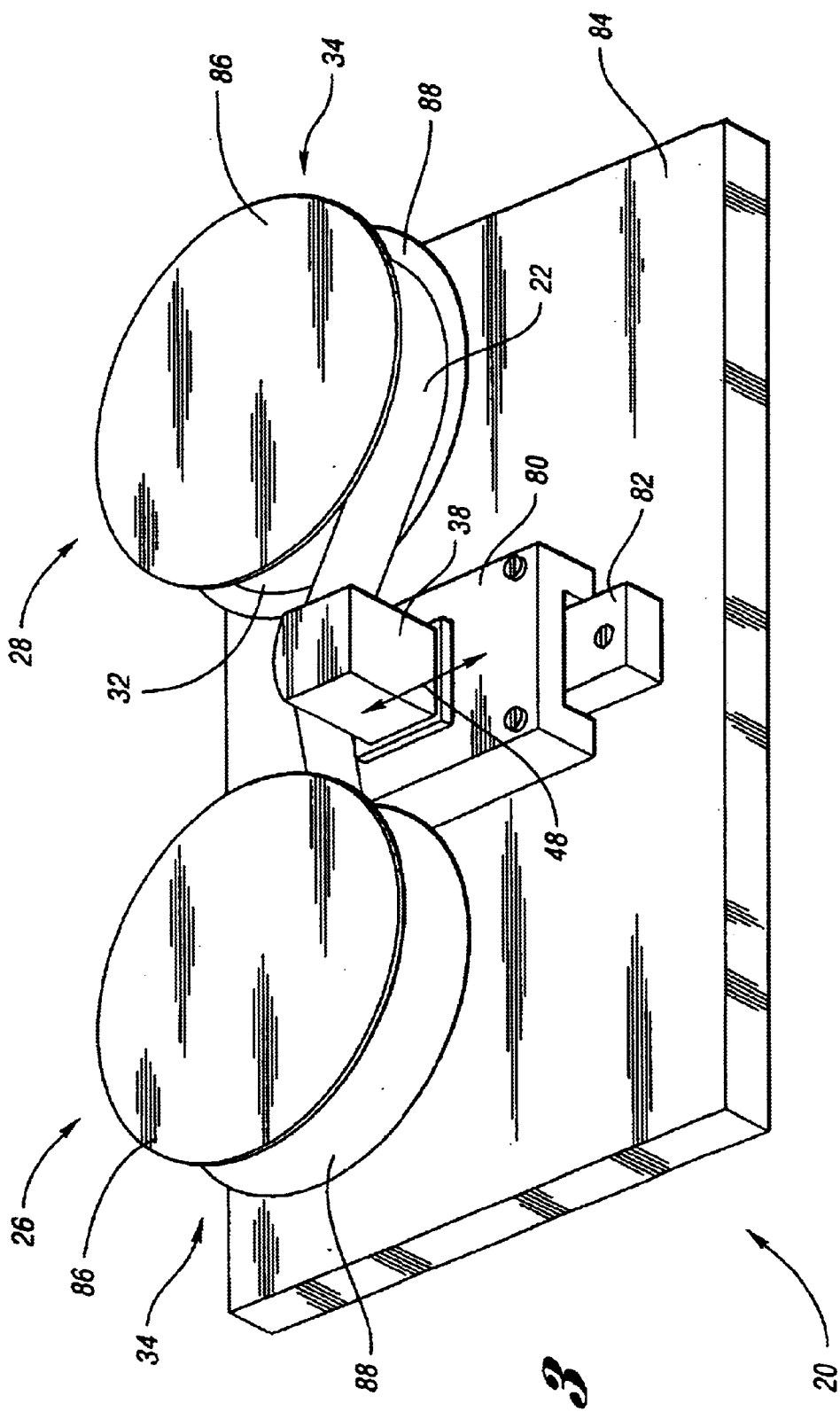
FIG. 3 is a detailed drawing of a tape transport system according to an embodiment of the present invention.

Referring now to FIG. 3, a detailed drawing of a tape transport system according to an embodiment of the present invention is shown. Tape head 38 is attached to stage 80. Stage 80 slides in head direction 48 on guide 82 rigidly attached to base 84. Thus, tape head 38 may be extracted from between reels 26, 28. Tape head 38 may be extracted to permit loading an unloading of either or both of reels 26, 28. Tape head 38 may also be extracted to permit tape 22 to be threaded between reels 26, 28. Tape head 38 may also be extracted to reduce friction on tape 22 and wear of contact surface 44 during rapid tape movement such as, for example, fast forward or rewind of tape 22. Tape head 38 may further be extracted to clean contact surface 44.

Each flange pair 34 includes top flange 86 and bottom flange 88. Each flange 86, 88 has a radius greater than the radius of fully wound tape pack 32. Top flanges 86 and bottom flanges 88 form parallel surfaces for guiding and positioning tape 22 across tape head 38.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape moving in a tape direction, the system comprising:
   a tape head having a curved tape contact surface;
   a first tape pack and a second tape pack, the magnetic tape moving along a first tape path when the magnetic tape is not being accessed by the tape head, the first tape path extending directly from the first tape pack to the second tape pack without contacting any tape guide elements; and
   a head drive operative to move the tape head onto the magnetic tape and through the first tape path thereby creating a second tape path, the second tape path extending from the first tape pack, directly around the tape contact surface and directly onto the second tape pack without contacting any tape guide elements;
   whereby substantially all of the second tape path varies as magnetic tape is transferred between the first tape pack and the second tape pack.

2. A tape transport system as in claim 1 wherein the magnetic tape has an outer side facing away from the first tape pack when the magnetic tape is wound on the first tape pack, the head drive moving the tape head to contact the magnetic tape outer side.

3. A tape transport system as in claim 1 wherein the second tape path contacts different portions of the curved tape contact surface as magnetic tape is transferred between the first tape pack and the second tape pack.

4. A tape transport system as in claim 1 wherein at least one of the first tape pack and the second tape pack is wound on a tape reel having a pair of parallel flanges.

5. A method of guiding magnetic tape past a tape head comprising:
   forming a first tape path extending in a straight line between a first tape pack and a second tape pack without contacting the tape head;
   forming a second tape path by moving the tape head through the first tape path, the second tape path extending in a straight line from the first tape pack to the tape head, around a curved surface on the tape head, and extending in a straight line from the tape head to the second tape pack; and
   changing the entire second tape path, except for a portion of the second tape path around the curved surface, based on amounts of tape on each of the first tape pack and the second tape pack.

6. A method of guiding magnetic tape past a tape head as in claim 5 wherein the magnetic tape is wound on the first tape pack with an outer side facing away from the first tape pack and wherein the magnetic tape is wound on the second tape pack with the outer side facing away from the second tape pack, the second tape path formed by moving the tape head to contact the magnetic tape outer side.

7. A method of guiding magnetic tape past a tape head as in claim 5 wherein amounts of tape on each of the first tape pack and the second tape pack determine which portions of the tape head curved surface are contacted by the second tape path.

* * * * *